March 17, 1931.  L. G. NICHOLSON  1,796,339
MOTOR VEHICLE
Filed June 6, 1928   2 Sheets-Sheet 1
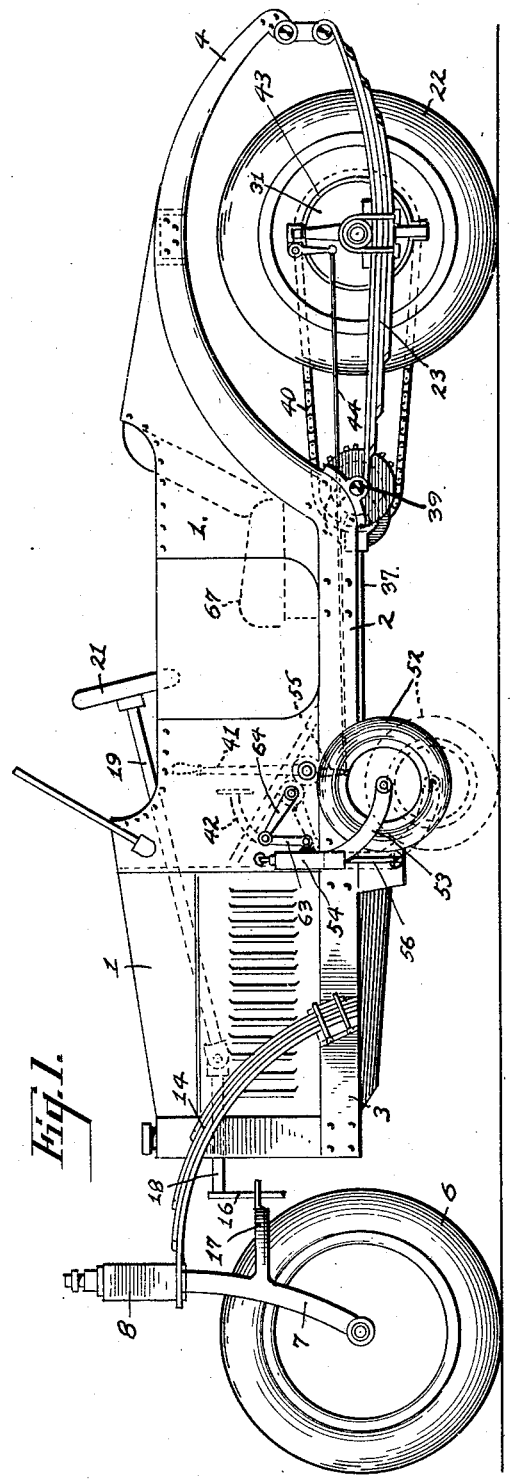
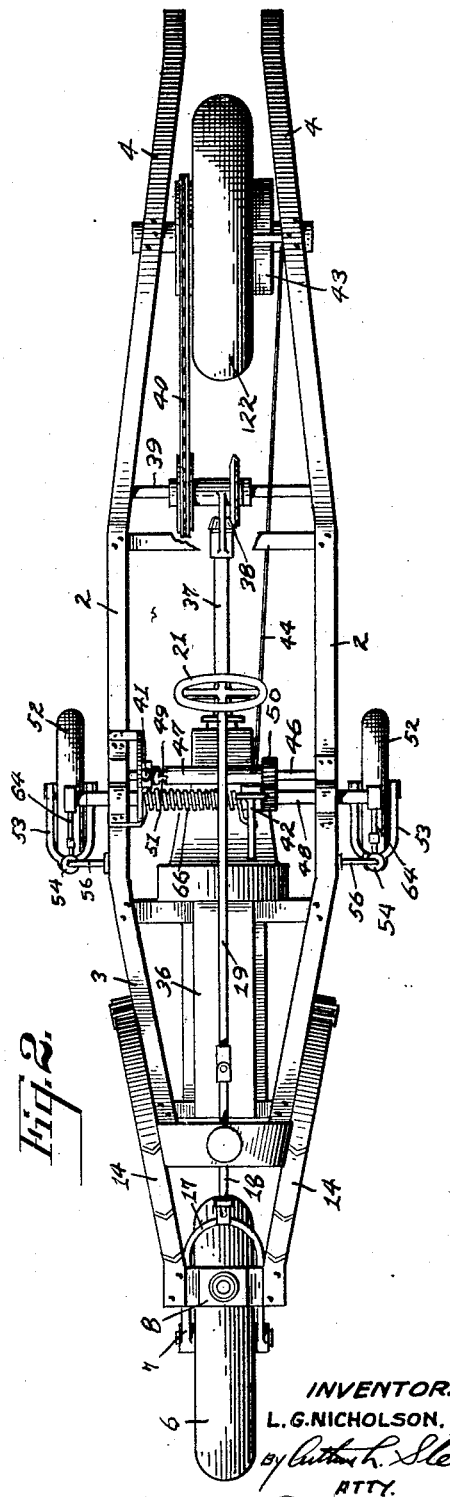
INVENTOR.
L. G. NICHOLSON.
By Arthur L. Slee
ATTY.

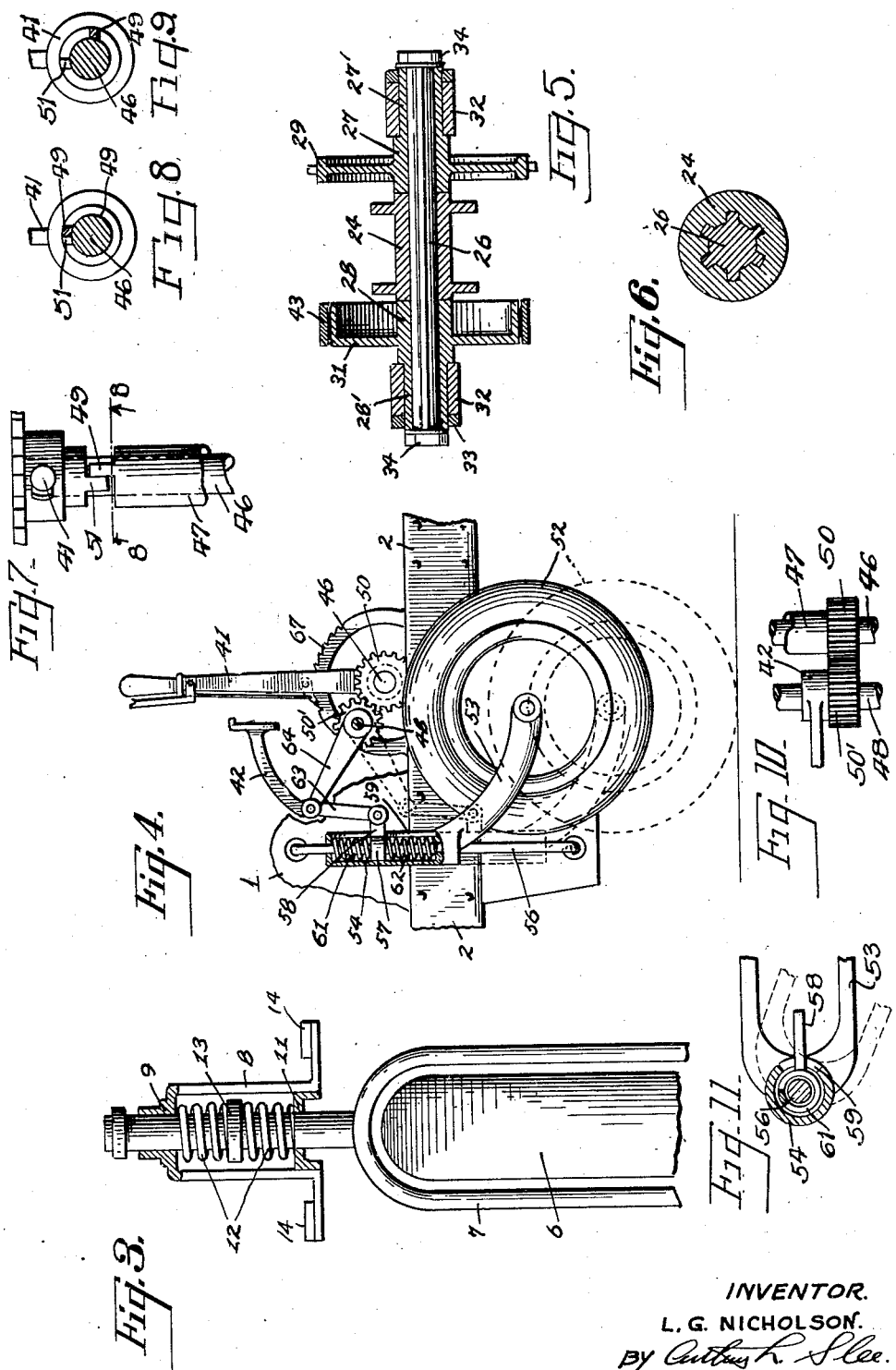

Patented Mar. 17, 1931

1,796,339

UNITED STATES PATENT OFFICE

LESLIE G. NICHOLSON, OF ST. HELENA, CALIFORNIA

MOTOR VEHICLE

Application filed June 6, 1928. Serial No. 283,360.

My invention relates to improvements in motor vehicles wherein a body normally supported upon two wheels arranged in tandem, is provided with a pair of side wheels arranged to be normally held out of contact with the ground and to be lowered to engage the ground and prevent overturning when the vehicle is slowed or stopped.

The primary object of my invention is to provide an improved two-wheeled motor vehicle provided with means for preventing overturning when moving slowly and when stopped.

Another object is to provide an improved vehicle which will reduce road resistance and which may be easily and safely operated.

A further object is to provide an improved vehicle of the character described wherein side wheels are arranged to be automatically lowered into engagement with the ground to prevent overturning when the brakes are applied or set.

Another object is to provide an improved device wherein side wheels are arranged to be lowered into operative position by the operation of the service brake when the vehicle is being slowed or, independently of said service brake, by the hand brake when set.

A further object is to provide an improved device of the character described wherein side or balancing wheels are pivotally, slidably, and resiliently mounted whereby the wheels may be moved to accommodate themselves to existing conditions when lowered into operative positions.

A further object is to provide an improved vehicle of the character described having improved means for dismounting the rear wheel without disturbing the driving and braking mechanism.

A still further object is to provide an improved machine which is light and efficient and which may be operated comfortably and relatively safely.

I accomplish these and other objects by means of the improved device disclosed in the drawings forming a part of the present application wherein like characters of reference are used to designate similar parts throughout the specification and drawings and in which—

Fig. 1 is a side elevation of my improved motor vehicle;

Fig. 2 is a plan view of the frame and operating mechanism of the vehicle;

Fig. 3 is a broken sectional detail of the front wheel supporting fork and its mounting;

Fig. 4 is a broken side elevation showing on a large scale the side wheels and the manner in which connection is made to the braking mechanism;

Fig. 5 is a sectional detail showing the manner in which the rear wheel and the driving and braking members are mounted;

Fig. 6 is a transverse section through the rear wheel hub;

Fig. 7 is a broken plan view drawn upon a larger scale of the hand brake lever and its connection to the side wheel actuating mechanism;

Figs. 8 and 9 are transverse sectional details taken upon the line 8—8 of Fig. 7 in the direction indicated, and showing the manner in which the sleeve is moved with or independently of the hand brake lever;

Fig 10 is a sectional detail of hand lever and service pedal connecting gears; and Fig. 11 is a transverse sectional detail of the side wheel mounting means.

Referring to the drawings, the numeral 1 is used to designate in general a body mounted upon frame members 2 having converging forward and rearward extensions 3 and 4 respectively.

A front wheel 6 is mounted within a fork 7 pivotally mounted in connection with a yoke 8 having spaced bearing portions 9 and 11, said fork being resiliently supported by means of springs 12 mounted around the upper post portion of the yoke between a collar 13 secured thereon and the bearing portions 9 and 11. The yoke is secured upon the outer ends of leaf springs 14 secured upon the forward extensions 3 of the frame 2. The front wheel and fork are pivotally turned for steering the vehicle by means of a steering arm 16 engaging a slotted steering yoke 17 extending rearwardly from the arms of the fork 7, said steering arm 16 being carried upon a shaft 18 mounted upon the shaft and actuated by a steering post 19 mounted in any suitable manner and provided with a steering wheel 21 as indicated in Figs. 1 and 2 of the drawings.

A rear wheel 22 is mounted between the rearward extensions 4 in tandem relation to the front wheel 6. The rear wheel is supported upon leaf springs 23 secured below the extensions 4 by suitable spring shackles. The rear wheel 22 is mounted by means of a hub 24 arranged to receive a splined axle 26 extending through said hub 24 and hubs 27 and 28 of a driving member 29 and a brake drum 31 as shown in the sectional details illustrated in Figs. 5 and 6 of the drawings. The driving member 29 is mounted upon one side of the rear wheel 22 and the brake drum 31 upon the opposite side. The hubs 27 and 28 are provided with outwardly disposed reduced extensions 27' and 28' arranged to be received within suitable journal boxes 32 mounted upon the springs 23. Collars 33 are removably secured upon the outer ends of the extensions 27' and 28' to retain said extensions in proper relation to the journal boxes. The splined axle 26 extends entirely through the hubs 27, 28 and 24 whereby all three are secured for rotation together with the axle 26 the ends of the axle being provided with suitable nuts 34 or other suitable securing means.

The vehicle is provided with a suitable motor designated in general by the numeral 36 and operating through a suitable power transmission for delivering power to the driving member 29. In the drawings I have illustrated an arrangement wherein the motor actuates a drive shaft 37 geared as at 38 to a transverse shaft 39 which in turn is connected to the driving member 29 by a suitable chain 40 the shaft 39 being axially alined with the forward shackles of the springs 23 whereby the relative movement of the body and spring will not materially alter the distance between the shaft 39 and the driving member 29.

The vehicle is provided with suitable brake mechanism, preferably comprising a hand lever 41 and a foot pedal 42 each arranged to operate a brake band 43 mounted around the brake drum 31 by means of a brake rod 44. The lever 41 is mounted upon a brake shaft 46 provided with a sleeve 47 geared to a shaft 48 upon which is mounted the foot pedal 42 by suitable gears 50 and 50'. The sleeve 47 is provided with a lug 49 arranged to be engaged by a lug 51 carried by the hand lever 41 whereby the sleeve may be turned by the hand lever, or, independently of the hand lever, by the pedal. When the hand lever 41 is pulled back from its normal position as shown in Fig. 4, the lug 51 engages the lug 49 and both lugs are moved from the normal position shown in full lines in Fig. 8 to a position such as shown in dotted lines, thereby rotating the sleeve 47 an amount corresponding to the movement of the lever 41. When the foot pedal 42 is depressed, the sleeve 47 is turned by means of the gears 50 and 50', the lug 49 being moved away from the lug 51 as shown in full lines in Fig. 9. The sleeve 47 is provided with an arm 55 arranged to engage the rod 44 for actuating the brake band 43 in the well known manner.

A pair of side wheels 52 are mounted upon suitable forks 53 having hollow post portions 54 slidably and pivotally mounted upon brackets 56 secured upon the sides of the vehicle approximately midway between the front and rear wheels. An actuating member 57 is mounted within each post portion 54 in slidable engagement with the bracket extending therethrough and provided with a lateral extension 58 extending outwardly through a slot 59 formed in the rearward side of the post portion, said slot 59 being of sufficient width to permit a pivotal movement of the post upon the bracket 56 and past the extension 58, as shown in Fig. 11 of the drawings, whereby the fork 53 and wheel 52 may turn upon the bracket 56 in the manner of a castor. Springs 61 and 62 are mounted within the post portion 54 of each fork above and below the actuating member 57. A link 63 is connected between each extension 58 and arms 64 secured upon the ends of the foot pedal shaft 48 whereby the operation of said shaft will move said arms 64 to operate the actuating members 57. A coil spring 66 is mounted around the shaft 48 with one end engaging the pedal 42 to hold the pedal 42 and the arms 64 in a normal raised position as shown in full lines in Fig. 4 of the drawings.

The body of the vehicle is provided with a seat 67 from which the steering wheel, brake actuating means, controls and the like are conveniently accessible.

In operation, the vehicle is driven by power from the motor 36 transmitted to the rear wheel as above described, and the vehicle is steered by turning the steering wheel to shift the front fork 7 in the obvious manner. When the machine is in motion it is balanced upon the front and rear wheels in the well known manner. The road resistance is limited to the two tandem wheels, and the machine is very light and may be operated comfortably and economically.

When it is desired to slow or stop the vehicle, the brakes are applied either by the foot pedal which operates as a service brake, or by the hand lever. When the brake is applied in either way, the shaft 48 is turned, thereby swinging the arms 64 downwardly and moving the actuating members 57 to press the forks downwardly, thereby causing the side wheels 52 to be moved into contact with the ground, as indicated in dotted lines in Fig. 4. The side wheels, when thus depressed, prevent the machine from overturning toward either side. When the brakes are released to again pick up speed, the side wheels are raised to normal inoperative position.

The side wheels are pivotally supported upon the brackets 56 so that the wheels may turn in the manner of castors as the vehicle is steered along the ground when the wheels are lowered into contact with the ground, thereby reducing resistance, and preventing undue wear upon the tires of said wheels. The springs 61 and 62 afford a resilient connection between the actuating members 57 and the forks 53 whereby the wheels may be raised or lowered to conform to inequalities in the surface being traversed. The lower springs 62 are somewhat compressed when the brakes are applied and the wheels lowered against the ground, thereby serving to hold the wheels in contact with the ground after the brakes have been partially released, thus permitting the machine to pick up speed sufficient to maintain its balance before the side wheels are raised clear from the ground. When the machine is to be left standing, the brakes are applied by the hand lever 41, thereby causing the side wheels to be lowered against the ground to support the machine and prevent overturning, said hand lever being held by a suitable ratchet 67.

The rear wheel may be removed to permit repair or replacement of a tire thereon, by removing the splined axle 26. When the axle is removed, the driving member 29 and the brake drum 31 are held in normal position in engagement with the journals 32, thereby permitting the wheel to be entirely removed without disturbing either the driving connections or the brake connections.

While I have illustrated my improved motor vehicle only in the form which I now regard as its preferred embodiment, the device is of course subject to modification in numerous ways without departing from the spirit of my invention. I therefore do not wish to restrict myself to the specific details of construction and arrangement, but desire to avail myself of all modifications which may fall within the scope of the appended claims.

Having thus described my invention, what I claim as new and desire to secure by Letters Patent is—

1. A motor vehicle comprising a body; single front and rear wheels mounted in tandem upon the body; steering and driving mechanism operatively connected to the wheels; braking mechanism; brake operating mechanism connected to the braking mechanism; brackets mounted upon opposite sides of the vehicle; side wheels mounting members slidably and pivotally mounted upon the brackets; a side wheel rotatably mounted upon each mounting member; and means connected to and actuated by the brake operating mechanism and engaging the mounting members to move the side wheels into engagement with the ground when the braking mechanism is applied.

2. A motor vehicle comprising a body; single front and rear wheels mounted in tandem upon the body; steering and driving mechanism operatively connected to the wheels; braking mechanism; brake operating mechanism connected to the braking mechanism; brackets mounted upon opposite sides of the vehicle; side wheel mounting members slidably and pivotally mounted upon the brackets, said members each comprising a slotted post portion engaging the adjacent bracket and a yoke portion; a side wheel rotatably mounted upon each yoke portion; and means connected to and actuated by the brake operating mechanism and connected to the wheel mounting members through the slots thereof to move the wheels into engagement with the ground when the braking mechanism is applied.

3. A mounting vehicle comprising a body; single front and rear wheels mounted in tandem upon the body; steering and driving mechanism operatively connected to the wheels; braking mechanism; brake operating mechanism connected to the braking mechanism; brackets mounted upon opposite sides of the vehicle; side wheel mounting members slidably and pivotally mounted upon the brackets, and each comprising a slotted post portion engaging the bracket and a yoke portion extending rearwardly from the post portion; a side wheel rotatably mounted upon each yoke portion; an actuating member slidably mounted upon each bracket within the mounting member thereon and provided with an extension extending outwardly through the slot thereof, said slot being of a width sufficient to permit pivotal movement of the members past the extensions; resilient means for imparting movement from the actuating members to the mounting members; and means connected to and actuated by the brake applying mechanism and engaging the actuating member extensions to move the side wheels into engagement with the ground when the braking mechanism is applied.

4. A motor vehicle comprising a body; single front and rear wheels mounted in tandem upon the body; steering and driving mechanism operatively connected to the wheels; braking means; brake operating means provided with a service brake lever and a hand brake lever; a pair of brackets mounted upon opposite sides of the body; a side wheel mounting member slidably and pivotally mounted upon each bracket and comprising a post portion engaging the bracket and a rearwardly extending yoke portion; a side wheel rotatably mounted upon each yoke portion; means connected to and actuated by the service brake lever and connected to the actuating members to move the side wheels into engagement with the ground when the service lever is moved to apply the braking mechanism; a sleeve rotatably mounted adjacent the hand brake lever; matching lugs formed upon the hand lever and upon the sleeve, the lug upon the lever being movable to engage the lug upon the sleeve and impart rotation thereto when the hand lever is moved to apply the braking mechanism; and gears connecting the sleeve with the service brake operating lever whereby operation of the hand lever operates to actuate the service brake lever and thereby move the side wheels to operative ground engaging position, the sleeve being rotatable to move its lug away from the lug of the hand lever to permit operation of the service brake lever independently of the hand lever.

5. A motor vehicle comprising a body; single front and rear wheels mounted in tandem upon the body; steering and driving mechanism operatively connected to the wheels; braking means; brake operating means provided with a service brake lever and a hand brake lever; a pair of brackets mounted upon opposite sides of the body; a side wheel mounting member slidably and pivotally mounted upon each bracket and comprising a slotted post portion engaging the bracket and a rearwardly extending yoke portion; a side wheel rotatably mounted upon each yoke portion; an actuating member slidably mounted upon each bracket within the mounting member thereon and provided with an extension extending outwardly through the slot thereof, said slot being of a width sufficient to permit pivotal movement of the post portion past the extension; resilient means for imparting movement from the actuating members to the mounting members; means connected to the actuating members and to the service brake lever to move the side wheels into engagement with the ground when the service lever is moved to apply the braking mechanism; a sleeve rotatably mounted adjacent the hand brake lever; matching lugs formed upon the hand lever and upon the sleeve, the lug upon the lever being movable to engage the lug upon the sleeve and impart rotation thereto when the hand lever is moved to apply the braking mechanism; gears connecting the sleeve with the service brake operating lever whereby operation of the hand lever operates to actuate the service brake lever and thereby move the side wheels to operative ground engaging position, the sleeve being rotatable to move its lug away from the lug of the hand lever to permit operation of the service brake lever independently of the hand lever.

6. The combination with a two wheel motor vehicle provided with braking mechanism having a service brake pedal and a hand brake lever, of a pair of brackets mounted upon the sides of the vehicle; side wheel mounting members slidably and pivotally mounted upon the brackets and movable therealong from a normal inoperative raised position to an operative lowered position, said members being provided with slotted post portions engaging the brackets and also provided with rearwardly extending yoke portions; side wheels mounted upon the yoke portions and movable thereby into engagement with the ground when the mounting members are lowered to operative position; actuating members slidably mounted upon the bracket within the post portions and provided with extensions extending laterally outward through the slots, said slots being of a width sufficient to permit pivotal movement of the posts past the extensions whereby the side wheels may be moved pivotally in the manner of castors; springs mounted within the post portions above and below the actuating members to resiliently impart movement therefrom to the post members; and means connected to and actuated by the braking mechanism and engaging the actuating member extension to move the side wheels to operative position when the braking mechanism is applied.

In witness whereof, I hereunto set my signature.

LESLIE G. NICHOLSON.